No. 864,418. PATENTED AUG. 27, 1907.
E. W. GOODRICH.
PROJECTION APPARATUS.
APPLICATION FILED DEC. 5, 1906.
3 SHEETS—SHEET 2.
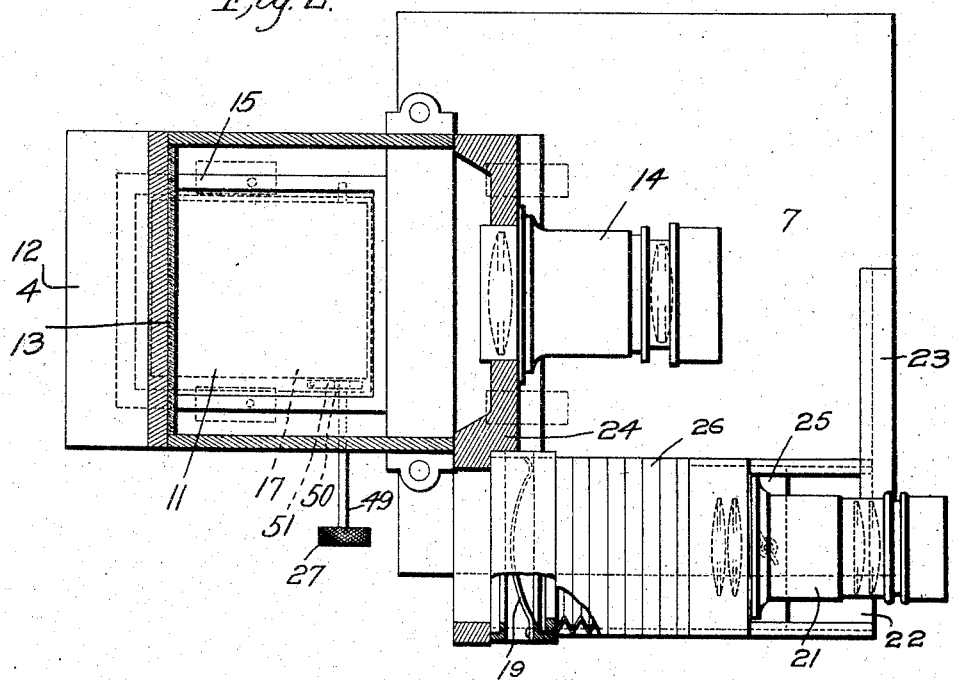
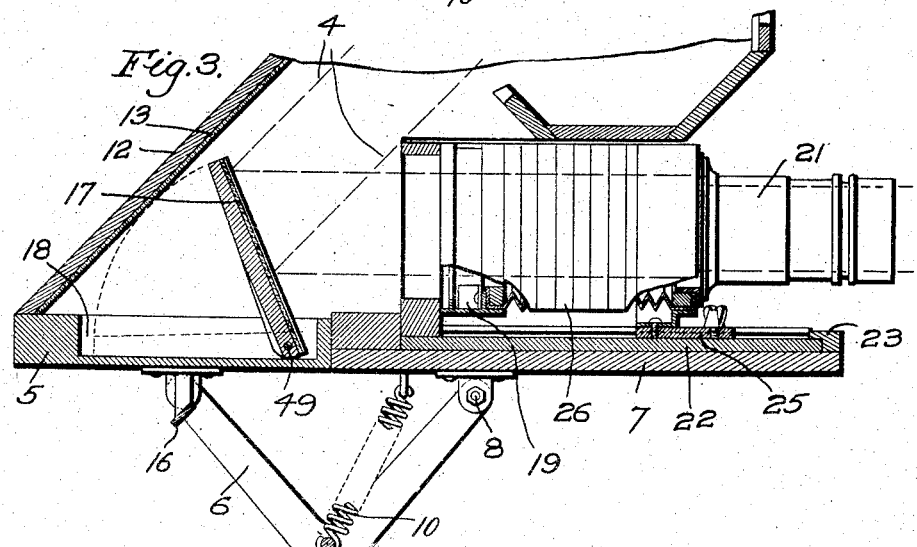
Witnesses
W. C. Lunsford.
Joseph M. Ward.
Inventor.
Emory W. Goodrich,
by Beverly & Guynn
Att'ys.

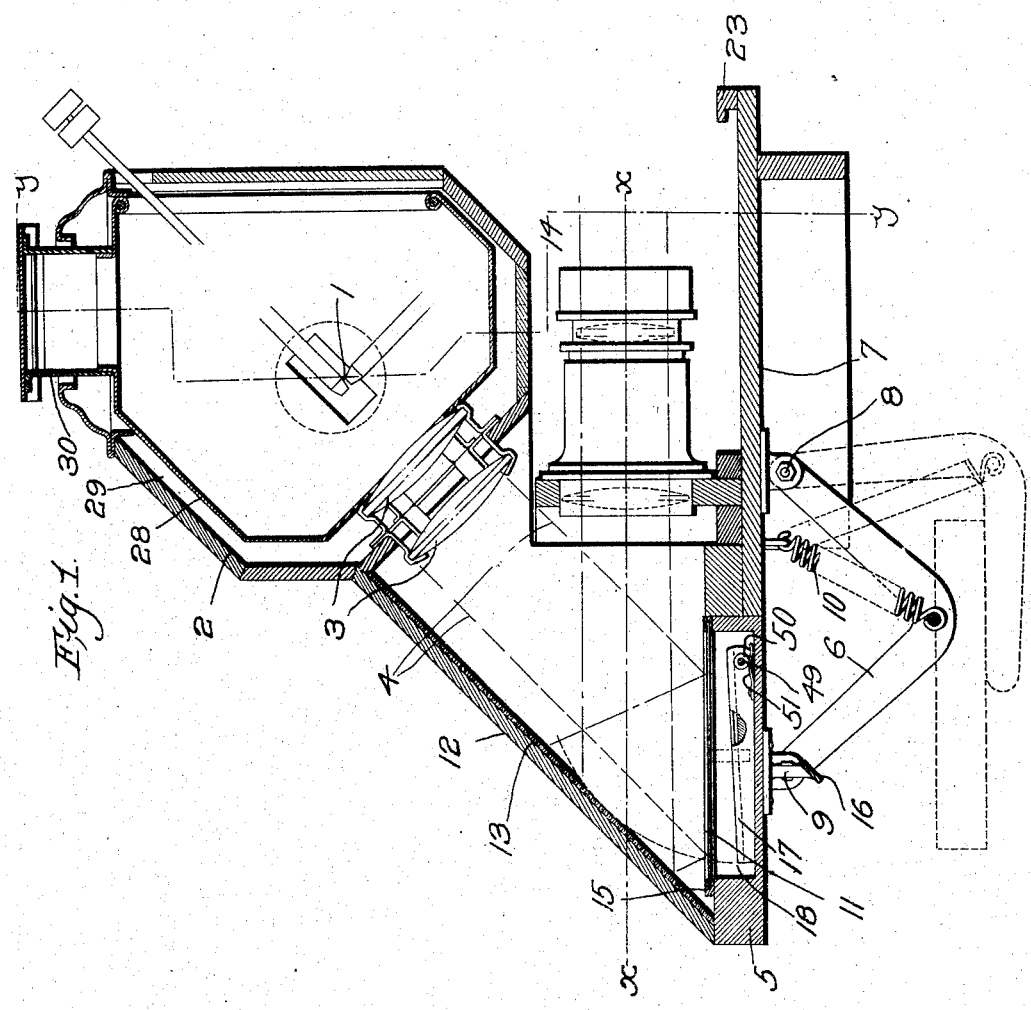

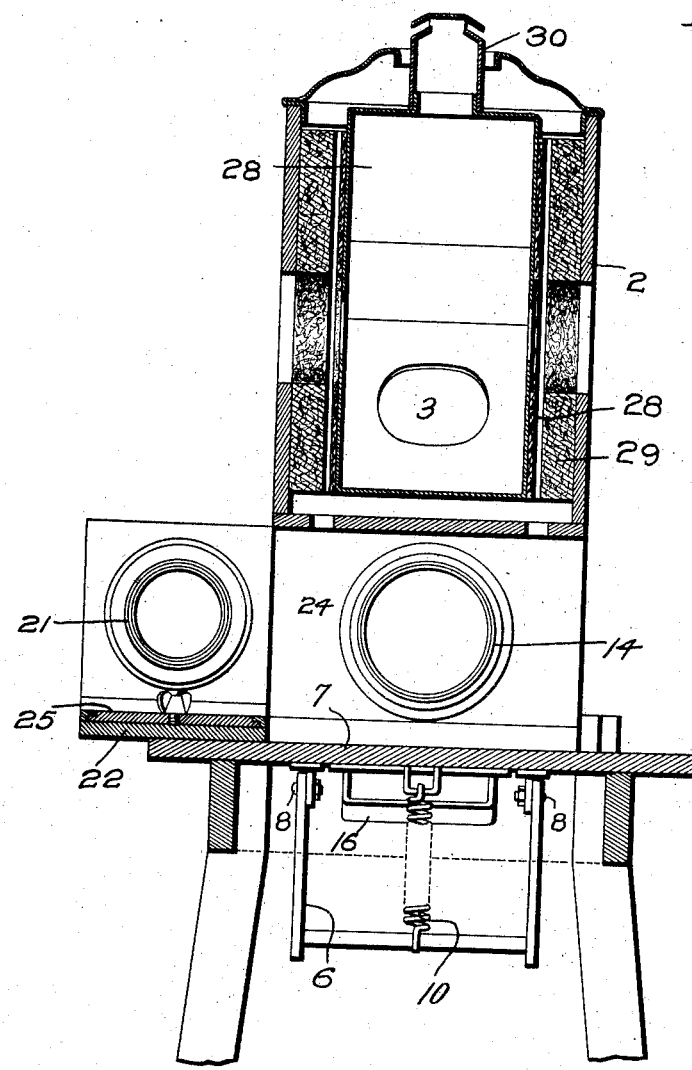

UNITED STATES PATENT OFFICE.

EMORY W. GOODRICH, OF SOMERVILLE, MASSACHUSETTS.

PROJECTION APPARATUS.

No. 864,418.   Specification of Letters Patent.   Patented Aug. 27, 1907.

Application filed December 5, 1906. Serial No. 346,332.

*To all whom it may concern:*

Be it known that I, EMORY W. GOODRICH, a citizen of the United States, residing at Somerville, county of Middlesex, and State of Massachusetts, have invented an Improvement in Projection Apparatus, of which the following description, in connection with the accompanying drawing, is a specification, like letters on the drawing representing like parts.

This invention relates to projection apparatus and especially to apparatus adapted for either transparent projection work or opaque projection work, and the object of the invention is to provide a novel apparatus of this character which can be easily and quickly transformed from an opaque projection apparatus to a transparent projection apparatus or vice versa; and also to provide an apparatus in which the opaque object may be supported in a horizontal position.

In the embodiment of the invention herein illustrated, I have shown two reflectors, one of which is used to reflect the light emanating from the illumined opaque object toward the objective when the device is used as an opaque projection apparatus, and the other of which reflects the beam of light toward the objective and through the transparency when the device is used as a transparent projection apparatus. The latter mirror is supported by the object-supporting table on which the opaque objects are adapted to rest, and when the device is used as an opaque projection apparatus, said mirror may be folded back out of the way; while when the device is to be used as a transparent projection apparatus the mirror may be thrown up into the proper position to reflect the beam of light toward the objective. The object-supporting table is also made adjustable so that different sized objects may be supported thereon. I have also shown two objectives, one for use when the apparatus is used as a transparent projection apparatus, and the other to be used when the apparatus is to be used as an opaque projection apparatus, the two objectives being so mounted that either one may be thrown into operative position. One objective, however, might be used without departing from the invention, but the advantage of using the two is that no adjustment of the objective is necessary in changing from opaque to transparent projection, it only being necessary to shift one objective out of operative position, and the other into operative position.

Other features of my invention and other advantages thereof will be more specifically described and then pointed out in the appended claims.

Referring now to the drawings wherein I have shown one apparatus embodying my invention, Figure 1 is a vertical section through the apparatus when it is adjusted for opaque projection; Fig. 2 is a horizontal section on substantially the line $x$—$x$, Fig. 1, looking down.

Fig. 3 is a partial section showing the apparatus as adjusted for transparent projection; Fig. 4 is a section on the line $y$—$y$, Fig. 1.

The lamp 1 is herein shown as an ordinary arc lamp, but it might be a lamp or light of any suitable character without departing from my invention. It is supported in a lamp-chamber 2 and the light rays emanating therefrom are collimated into a beam 4 by a condensing lens 3 of any suitable or usual construction. This beam of rays 4 is thrown either on to the opaque object for illuminating it or on to a reflector which reflects it toward and through the transparent object according as the apparatus is used for opaque or transparent projection. The opaque object is supported on an object-supporting table 5 which is herein shown as supported by an arm 6 which is pivoted to the base 7, as at 8. The table 5 is preferably pivoted to the arm 6, as at 9, so that said table 5 may be maintained in its horizontal position in every position of the arm, as shown in dotted lines Fig. 1. Said table is normally held in the full line position Fig. 1 by means of a suitable spring 10.

Situated above the table 5 within the housing 12 is a reflecting surface 13 which may be a mirror or any other suitable reflector and which is arranged to reflect the light rays that are radiated from the object 11 toward the objective 14 which may be of any suitable construction and which is arranged to project the reflected image on to the screen. The object which is projected, therefore, is in fact the reflection of the object in the mirror 13. The object 11 may be laid directly on the table 5 or may be supported in a suitable holder 15 which rests on said table. By mounting the table on the pivoted arm 6, said table may be raised or lowered to accommodate objects of different thickness and different sizes without carrying the face of the object out of line with the beam of rays 4. The table is preferably provided on its under side with a suitable handle 16 by means of which it may be raised and lowered and maintained in its proper horizontal position.

Supported on the table 5 is another reflector 17 which may be a mirror or any other reflecting surface which is adapted to be thrown into operative position when the apparatus is converted into a transparent projection apparatus, as shown in Fig. 3. In the present embodiment of my invention this reflector 17 is received in a recess 18 formed in the table 5 and is covered by the object 11 when the device is used for opaque projection. When, however, the apparatus is to be used for transparent projection work, the holder 15 is removed and the reflector 17 is swung into substantially the position shown in Fig. 3, in which position it stands in the path of and reflects the beam 4 toward the objective, and through the transparency carried in a suitable holder 19. I prefer to use two objectives 21 and 14, one for transparent projection work and the other for opaque projection work, and to mount these objectives so that either one may be brought into operative position. As herein shown both objectives are mounted on a slide 22 which is supported on the base 7 and is adapted to be moved transversely thereof, said slide being guided in its movement by a suitable guide 23. This slide 22 is provided with the back member 24 to which both the objective 14 and the holder 20 for the transparency are secured, and in order to provide for properly focusing the image of the transparency, I preferably mount the objective 21 upon a slide 25 which can be moved toward and from the holder 20, said objective being connected with the holder by means of a bellows 26.

Any suitable means may be employed for holding the mirror 17 in its adjusted position, and one convenient way of accomplishing this is by pivoting the mirror to the table 5 and making the pivoted connection such that said mirror will be frictionally held in any adjusted position. As herein shown the pivotal pin 49 of the mirror 17 has a friction member 50 thereon against which bears a spring 51, the friction generated between the spring and friction member being sufficient to hold the mirror in any adjusted position. The pivotal pin 49 is preferably extended beyond the table and provided with a thumb-piece 27 by which the position of the mirror may be adjusted.

In order to make the apparatus as compact as possible I preferably arrange the lamp-chamber 2 over the objectives and so place the condensing lens 3 that the beam 4 is directed obliquely on to the table 5. In the embodiment of the invention herein illustrated the beam 4 extends substantially parallel to the reflector 13.

I have shown the light 1 as received within a housing or casing 28 which in turn is received within the lamp-chamber 2 and preferably the space between the housing and the walls of the lamp-chamber 2 are packed with some non-heat-conducting material 29 so as to prevent the heat generated by the lamp from injuring the material of the casing. I have found for this purpose that ventilated asbestos packing is satisfactory in every way.

30 designates the chimney through which the hot air and products of combustion escape.

An apparatus constructed as herein shown is very compact in its construction and can be readily and quickly changed from opaque to transparent projection. Further the table 5 for supporting the opaque projection is always in horizontal position, and as a result this apparatus can be used to project the image of opaque projections of any character. Many opaque projection apparatus are so constructed that the opaque object is held in a vertical position, but with apparatus of this type it is not possible to project images of such opaque objects as cannot be turned out of a horizontal position without destroying or disarranging the view which it is desired to project.

I have herein shown one embodiment only of my invention, and therefore the invention is not limited to the precise details illustrated.

Having fully described my invention, what I claim as new and desire to secure by Letters Patent is:—

1. In a projection apparatus, the combination with an object-supporting table, of means to produce a beam of light and project it directly onto said table, an objective, and a reflector in position to reflect toward the objective the light rays radiating from the illumined object.

2. In a projection apparatus, means for producing a beam of light, a horizontal object-supporting table having an angular relation to said beam, an objective, and a reflector in a plane substantially parallel to the beam of light to reflect the light rays radiating from the illumined object toward the objective.

3. In a projection apparatus, the combination with an object-supporting table of means to direct a beam of light toward said table, two movably mounted objectives either one of which may be moved into operative position, a reflector adjustably carried by the table to reflect the beam toward one objective when it is in operative position, and a fixed reflector situated to reflect the light radiated from the illumined object toward the other objective when the latter is in operative position.

4. In a projection apparatus, the combination with an object-supporting table having a recess of means to direct a beam of light toward the table, an objective, and an adjustable reflector normally occupying said recess but adapted to be moved into position to reflect the beam of light toward the objective.

5. In a projection apparatus, the combination with a horizontal object-supporting table, means to direct a beam of light toward said table, two movable objectives either of which may be brought into operative position, a reflector hinged to the table and adapted to occupy either a position parallel with the top of the table or a position to reflect the beam of light toward the operative object, and a fixed reflector to reflect light rays radiating from an illumined object supported by the table toward the operative objective.

6. In a projection apparatus, the combination with a casing of a horizontal object-supporting table, an arm pivoted to said table and also to the casing, means to direct a beam of light toward the table, an objective, and a fixed reflector to reflect light rays radiating from an illumined object carried by the table toward the objective.

7. In a projection apparatus, the combination with a horizontal vertically-adjustable table, of means for producing a beam of light and projecting it directly onto said table, an objective, and a reflector in position to reflect toward the objective light rays radiating from an illumined object on the table.

8. In a projection apparatus, the combination with a horizontal vertically-adjustable table of means to direct a beam of light toward said table, two movably mounted objectives either one of which may be moved into operative position, a reflector adjustably carried by the table to reflect the beam toward one objective when it is in operative position, and a fixed reflector situated to reflect the light radiated from the illumined object toward the other objective when the latter is in operative position.

In testimony whereof, I have signed my name to this specification, in the presence of two subscribing witnesses.

EMORY W. GOODRICH.

Witnesses:
LOUIS C. SMITH,
BERTHA F. HEUSER.